United States Patent [19]

Ohta et al.

[11] Patent Number: 4,917,751
[45] Date of Patent: Apr. 17, 1990

[54] METHOD OF PRODUCING DOUBLE SIDED OPTICAL MEMORY DISKS

[75] Inventors: Kenji Ohta, Yao; Hiroyuki Katayama; Akira Takahashi, both of Nara; Yoshiteru Murakami, Nishinomiya; Junji Hirokane, Tenri, all of Japan

[73] Assignee: Sharp Kabushiki Kaisha, Osaka, Japan

[21] Appl. No.: 328,743

[22] Filed: Mar. 20, 1989

Related U.S. Application Data

[60] Division of Ser. No. 222,357, Jul. 20, 1988, abandoned, which is a continuation of Ser. No. 120,227, Nov. 10, 1987, abandoned, which is a continuation of Ser. No. 727,414, Apr. 25, 1985, abandoned.

[30] Foreign Application Priority Data

May 11, 1984 [JP] Japan .................. 59-95436
May 12, 1984 [JP] Japan .................. 59-95423

[51] Int. Cl.$^4$ ........................... B32B 31/28
[52] U.S. Cl. ...................... 156/272.2; 156/291; 156/295; 156/302; 156/303; 156/307.3; 156/307.7; 365/215; 369/281; 369/286; 428/64
[58] Field of Search .......... 156/295, 291, 302, 303, 156/552, 307.1, 307.3, 307.7, 272.2; 369/286, 280, 281, 283; 365/215; 428/64, 65, 66

[56] References Cited

U.S. PATENT DOCUMENTS 4,191,800  3/1980  Holtzman ............... 428/251
4,390,600  6/1983  Ohta et al. ............. 428/621
4,414,650  11/1983 Ohta et al. ............. 365/122
4,467,383  8/1984  Ohta et al. ............. 360/131
4,489,139  12/1984 Ohta et al. ............. 428/621
4,544,443  10/1985 Ohta et al. ............. 156/643
4,610,912  9/1986  Takahashi et al. ...... 428/213
4,686,543  8/1987  Tani et al. ............. 428/65 X
4,740,947  4/1988  Ohta et al. ............. 369/286

FOREIGN PATENT DOCUMENTS 48-11588  4/1973  Japan .................. 156/295

Primary Examiner—David Simmons
Assistant Examiner—Mark Osele
Attorney, Agent, or Firm—Flehr, Hohbach, Test, Albritton & Herbert

[57] ABSTRACT

Double sided optical memory disks are produced by dropping a viscous adhesive material hardenable by ultraviolet radiation at predetermined longitudinal intervals onto an elongated cloth material of uniform thickness thereby causing the adhesive material to become absorbed by and contained in the cloth material, thereafter placing this cloth material sandwichedly between two optical disk pieces each containing a recording layer, thereafter applying pressure between these pieces such that the sandwiching pieces remain separated uniformly by a predetermined separation distance, and thereafter applying ultraviolet radiation to and thereby hardening the adhesive material while the disk pieces are maintained at the uniform separation distance.

5 Claims, 2 Drawing Sheets

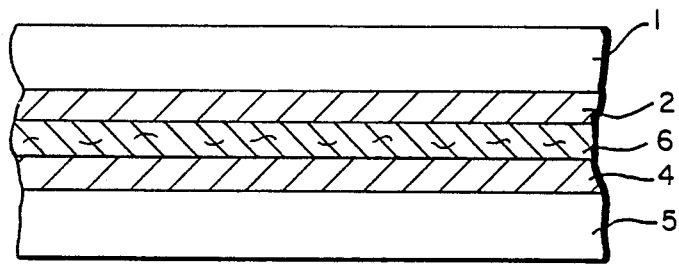
FIG.—1
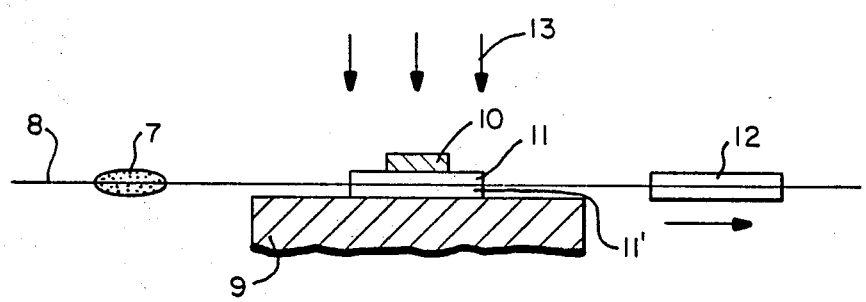
FIG.—2a
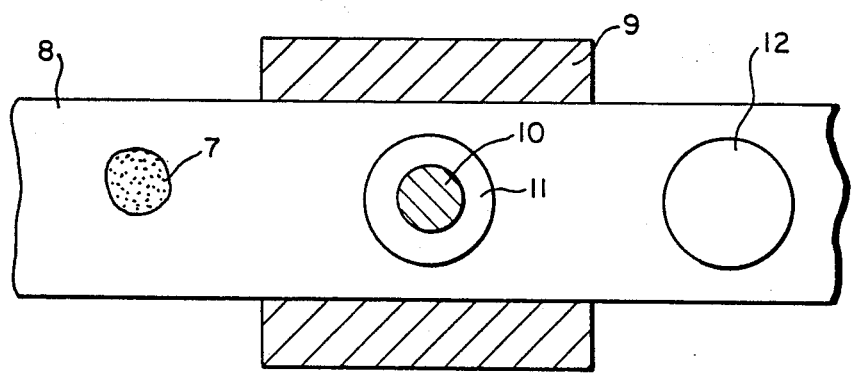
FIG.—2b

METHOD OF PRODUCING DOUBLE SIDED OPTICAL MEMORY DISKS

This is a divisional of application Ser. No. 222,357 filed July 20, 1988, now abandoned, which is a continuation of application Ser. No. 120,227 filed Nov. 10, 1987, now abandoned, which is a continuation of application Ser. No. 727,414 filed Apr. 25, 1985, now abandoned.

This invention relates to a method of producing an optical memory disk for optically recording and reproducing information.

Optical memory elements are coming to be considered important high-density, large-capacity memory devices and many research and development efforts are concentrated in particular on optical disk devices because of their ability to reduce the access time as compared to magnetic tapes and the like. The structure of a prior art optical memory disk is shown in FIG. 5 wherein numerals 1' and 5' are individually a transparent substrate made of glass or acrylic resin, numerals 2' and 4' are both recording layers made, for example, as a single layer of film of a magnetic material or a multi-layer structure combining dielectric, magnetic and reflective films, and numeral 3' is an adhesive layer, for example, of a resin which is hardenable by ultraviolet rays. Optical memory elements with a double layer structure like this are advantageous because information can be stored on both the front and back surfaces so that the amount of information which can be stored per unit area is effectively doubled. A further advantage may be obtained if acrylic resin is used for the transparent substrates 1' and 5' because this can reduce substrate deformation. In this case, however, it becomes critically important to eliminate unevenness in the thickness of the adhesive layer 3' and variations in the element thickness. In the case of a disk-shaped optical memory element, for example, unevenness in thickness can cause an imbalance when the element is rotated. Optical memory elements must be manufactured, in particular, by stringently controlling the variations in the thickness of the adhesive layer 3'.

It is therefore an object of the present invention to provide an optical memory element having an adhesive layer with even thickness and a method of manufacturing optical memory elements of a double layer type whereby unevenness in the adhesive layer can be eliminated.

The above and other objects of the present invention are attained by an optical memory element comprising two substrates containing recording layers, an adhesive layer and a cloth-like material contained in the adhesive layer. Such an optical memory element may be manufactured by the steps of causing an adhesive material to become absorbed by and contained in a cloth-like material, placing this cloth-like material between two substrates containing recording layers, applying pressure between these substrates and allowing the aforementioned adhesive material to harden.

FIG. 1 is a cross-sectional schematic of an optical memory element according to an embodiment of the present invention.

FIG. 2(a) is a side view and FIG. 2(b) is a plan view, illustrating schematically a method of manufacturing an optical memory element according to the present invention.

Figure 3:
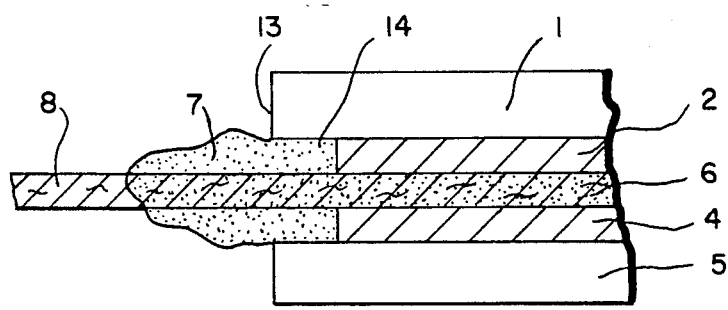
FIG. 3 is a cross-sectional schematic for showing an effect of the manufacturing method of FIGS. 2(a) and 2(b).

There is shown schematically in FIG. 1 an enlarged cross-sectional view of a portion of an optical memory element comprising transparent substrates 1 and 5 made, for example, of glass or acrylic resin and recording layers 2 and 4, each formed as a single layer of film of a magnetic material or a multi-layer structure combining dielectric, magnetic and reflective films. Numeral 6 indicates an adhesive layer made of a material such as cloth (hereinafter referred to as cloth-like material), in which an adhesive material such as a resin material hardenable by ultraviolet radiation is absorbed.

One advantage of the adhesive layer 6 formed with a cloth-like material in which an adhesive material is absorbed is that the layer thickness can be made uniform, determined by that of the cloth-like material. Another advantage is that the amount of the adhesive material required for manufacturing the element is reduced by the volume of this cloth-like material inside the adhesive layer. Moreover, since a plurality of optical memory elements can be glued to a cloth-like material in a tape-like shape (or elongated like a tape), or since the cloth-like material can be used as a carrier, it becomes unnecessary to touch the optical memory elements by hand and the surfaces of the elements can be kept clean more easily.

Optical memory elements of FIG. 1 may be produced as shown in FIGS. 2(a) and 2(b) wherein numeral 8 is a cloth-like material in the shape of tape which plays the role of a carrier for the optical memory elements to be produced. An adhesive material 7 with an appropriate viscosity (such as several 100 cps) which is hardenable by ultraviolet radiation is dropped on this material 8 at predetermined intervals so that it becomes absorbed by it. It is then sandwiched between optical memory element pieces 11 and 11' on a table 9 and a pressure is applied from above by means of a plate 10. The optical memory element piece 11 is formed with the first transparent substrate 1 of FIG. 1 having thereon the recording layer 2 containing a magnetic film. Similarly, the optical memory element piece 11' is formed with the second transparent substrate 5 of FIG. 1 having thereon the recording layer 4. The cloth-like material 8 containing the adhesive material 7 is sandwiched between them so that the recording layers 2 and 4 are maintained in a face-to-face relationship while the pressure is applied. When the interval (separation) between the optical memory element pieces 11 and 11' has become uniform, ultraviolet radiation 13 is applied to harden the adhesive material 7. The optical memory element of a double-layer construction thus manufactured is thereafter transported by moving by a predetermined distance the cloth-like material 8 which also serves as a carrier as shown by a right-arrow. Numeral 12 shows a transported optical memory element of a double-layer construction which has already been glued together.

The manufacturing method described above is advantageous also in that the portion of adhesive material 7 which spills out from an element as shown in FIG. 3 becomes reabsorbed by the cloth-like material 8 and does not get stuck on the side surface 13 or drop onto the table 9. In other words, the removal of excess adhesive material is easily effected according to the method described above. Numeral 14 indicates a light transmissive region.

Figure 4:
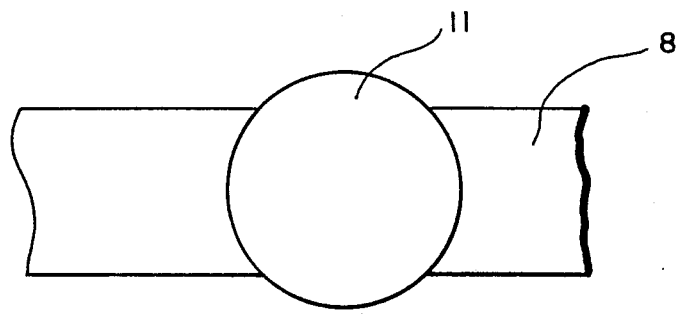
FIG. 4 shows another method of manufacturing an optical memory element according to the present invention.
Figure 5:
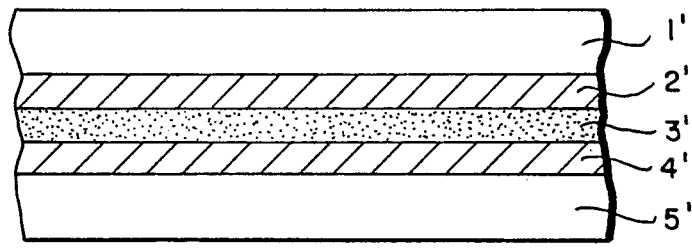
FIG. 5 is a cross-sectional schematic showing the structure of a prior art optical memory element.

The present invention has been described above in terms of only one embodiment. It is to be understood, however, that many variations which may be made thereon are still to be considered within the purview of the present invention. For example, the cloth-like material 8 may be textile or non-textile. It may also be of a lattice-like structure. Its thickness will depend upon the type of the optical memory element but should normally be about 50–500 μm in the case of an optical memory disk. The width of the cloth-like material 8 should preferably be greater than the size of the memory element 11 as shown in FIG. 2(b) but it is not a requirement. Even if it is narrower than the dimension of the optical memory element 11 as shown in FIG. 4, it is sufficient as long as it can serve as a spacer. As for other material characteristics of the cloth-like material 8, transparent materials with index of refraction about 1.4–1.6 are preferable because the cloth-like material becomes unobservable from outside regarding the optical memory disk, thus improving the appearance of the finished product.

When use is made of an adhesive material which is hardenable by ultraviolet rays, it is preferable to provide light-transmissive sections at the side surfaces of the optical memory element as shown by numeral 14 in FIG. 3.

An anaerobic adhesive should be used, if possible, because it will continue to harden as time elapses.

In summary, not only can double-surface optical memory elements be glued easily according to the present invention but the thickness of the adhesive layer can be made evenly uniform. The scope of the present invention is limited only by the following claims.

What is claimed is:

1. A method of producing double sided optical memory disks comprising the steps of
    dropping a viscous adhesive material hardenable by ultraviolet radiation at predetermined longitudinal intervals onto an elongated cloth material of uniform thickness so as to cause said adhesive material to become absorbed by and contained in said cloth material,
    thereafter placing said cloth material sandwichedly between a first optical disk piece and a second optical disk piece, each of said optical disk pieces containing a recording layer,
    thereafter applying pressure between said first and second optical disk pieces with said cloth material sandwiched therebetween such that said first and second optical disk pieces remain separated uniformly by a predetermined separation distance, and
    thereafter applying ultraviolet radiation to and thereby hardening said adhesive material while said first and second optical disk pieces are maintained at said uniform separation distance.

2. The method of claim 1 wherein said adhesive material has viscosity of several hundred cps.

3. The method of claim 1 wherein said pressure applying step comprises allowing some of said adhesive material to spill over edges of said optical disk pieces and become reabsorbed by said cloth material.

4. The method of claim 1 wherein said cloth material and said optical disk pieces are horizontally disposed, said second optical disk piece being placed on a horizontal top surface and said pressure being applied by a force applied vertically downward on said first optical disk piece.

5. The method of claim 4 further comprising the step of pulling said cloth material longitudinally after said ultraviolet radiation applying step to remove completed one of said optical memory disks away from where said force is applied thereonto.

* * * * *